(No Model.)

G. MOORE.
WHEEL PLOW.

No. 440,644. Patented Nov. 18, 1890.

Witnesses:
John L. Jackson.
Ella Nesbett.

Inventor:
Gilpin Moore
by Bond, Adams & Jones
attys

UNITED STATES PATENT OFFICE.

GILPIN MOORE, OF MOLINE, ILLINOIS, ASSIGNOR TO DEERE & COMPANY, OF SAME PLACE.

WHEEL-PLOW.

SPECIFICATION forming part of Letters Patent No. 440,644, dated November 18, 1890.

Application filed June 2, 1890. Serial No. 354,018. (No model.)

*To all whom it may concern:*

Be it known that I, GILPIN MOORE, residing in Moline, county of Rock Island, State of Illinois, and a citizen of the United States, have invented a new and useful Improvement in Wheeled Plows, of which the following is a specification, reference being had to the accompanying drawings, in which—

Figure 1:
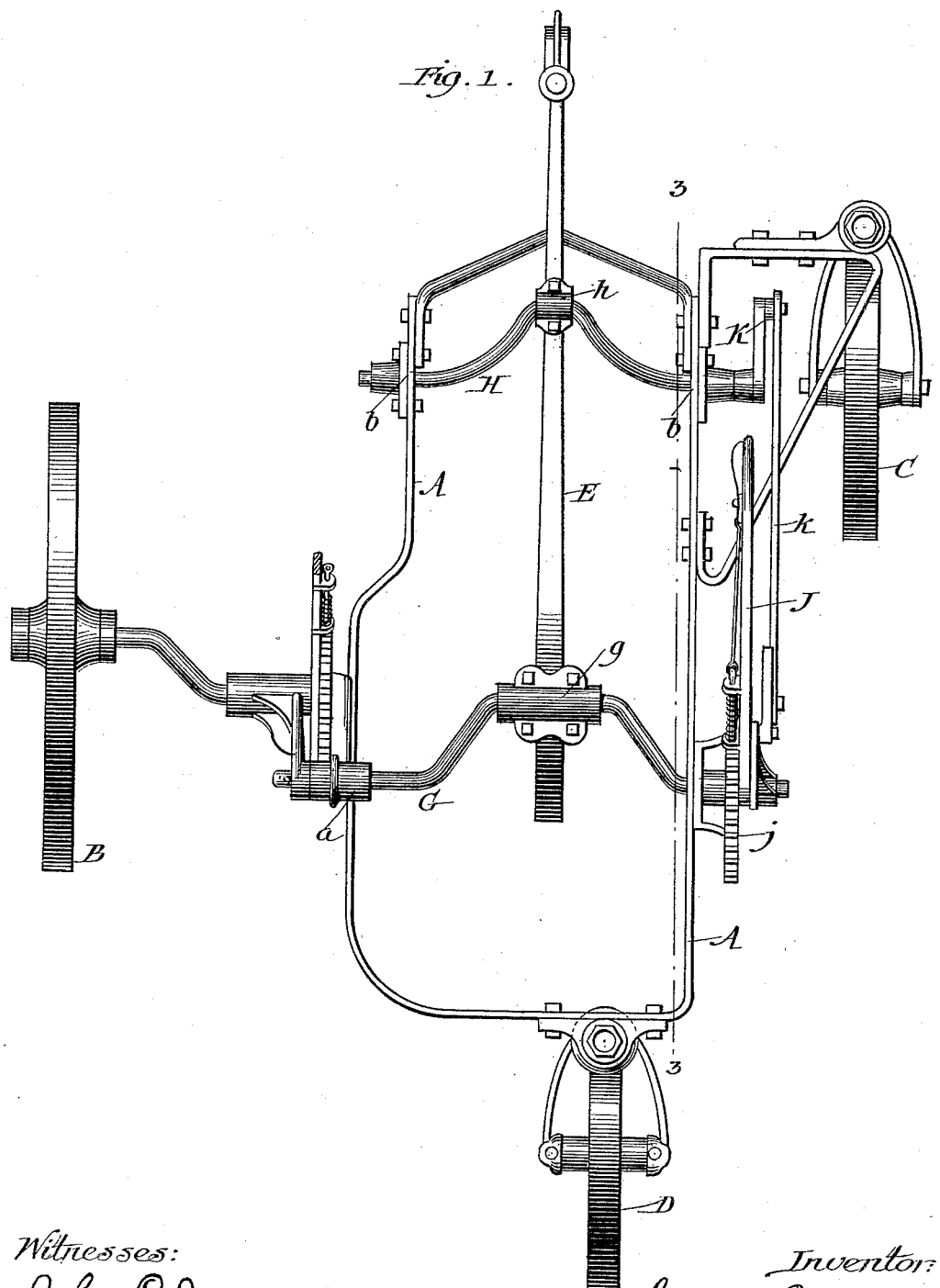
Figure 2:
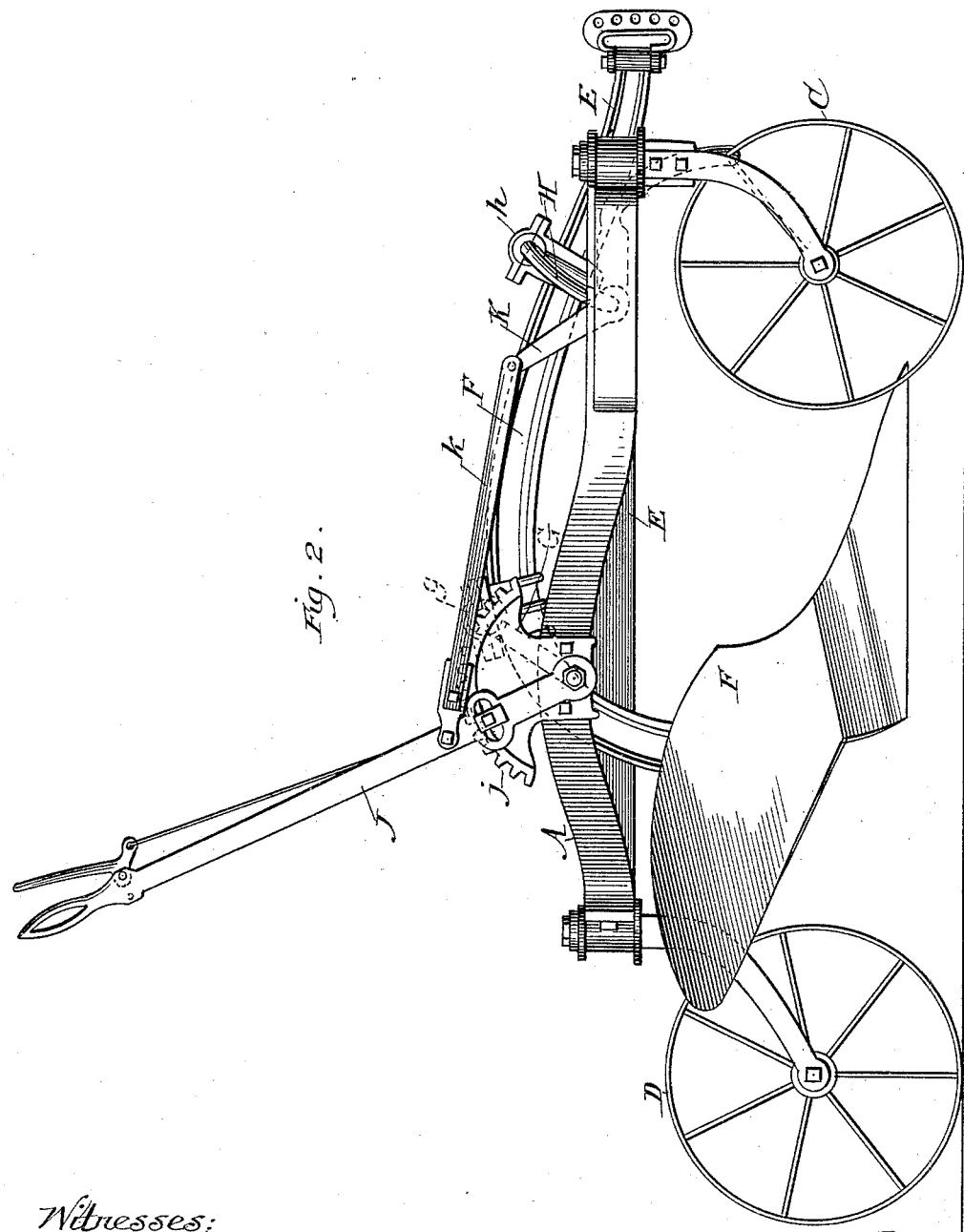
Figure 3:
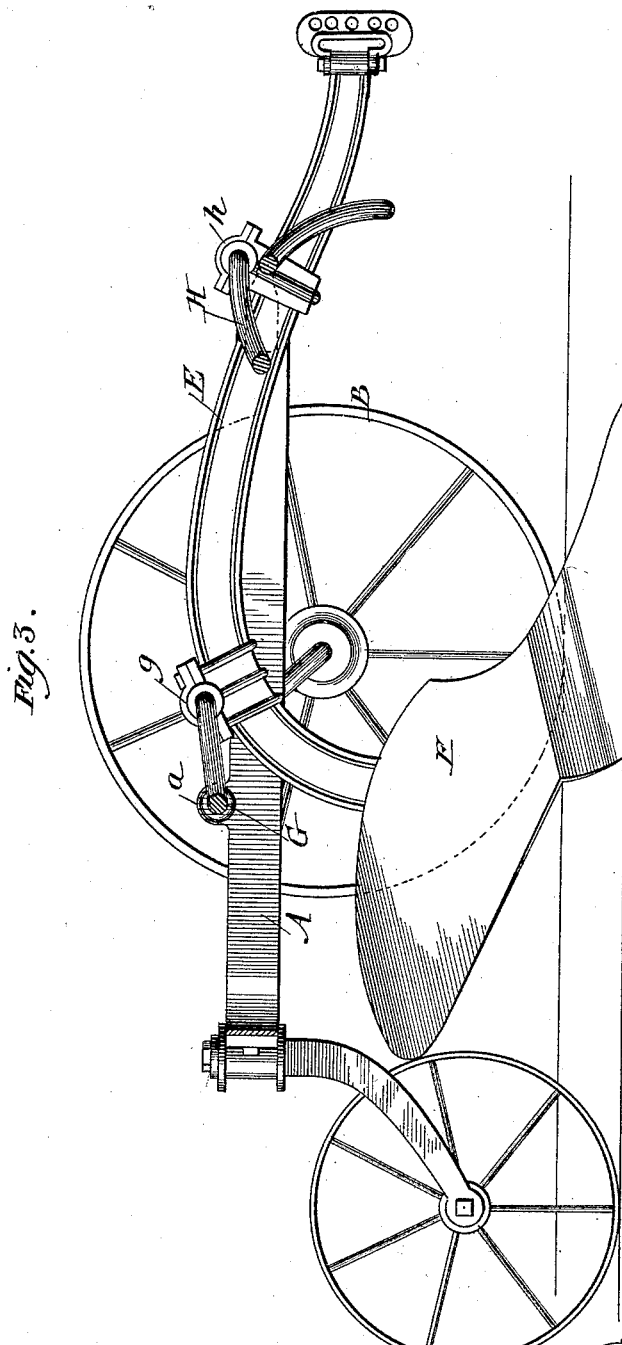

Figure 1 is a plan view. Fig. 2 is a side elevation, and Fig. 3 is a longitudinal section on line 3 3 of Fig. 1.

Only so much of the plow is shown as is necessary to illustrate my invention.

This invention relates to wheeled plows, and it is particularly designed to be used in connection with three-wheeled plows.

The object of this invention is to hang the plow from the plow-frame in such manner that the plow will be raised or lowered squarely in order to give the plow the proper amount of pitch or suction. I accomplish this object by hanging the plow upon two cranks or bails and by providing the cranks or bails with a lifting device by which they are lifted simultaneously, as illustrated in the drawings and hereinafter set forth. That which I claim as new will be pointed out in the claims.

In the drawings, A represents the plow-frame. This frame may be made in any suitable form adapted to support the parts hereinafter mentioned.

B is a carrying-wheel.

C is a caster-wheel, which runs in the furrow in front of the plow when plowing.

D is a caster-wheel, which runs in the furrow in rear of the plow.

The arrangement of the wheels B, C, and D may be varied. The arrangement shown, however, is the best known to me.

E is the plow-beam, which may be made in the usual form and provided with a clevis at its forward end for the attachment of the evener.

F is the plow.

G is a bail or crank, which is supported in suitable bearings $a$ in the frame A, and is attached to the plow-beam E above the plow F by a suitable box $g$.

H is a second bail or crank mounted in suitable bearings $b$ in the frame A and attached to the forward part of the plow-beam E by a suitable box $h$.

J is a lever, which is secured upon the end of the bail or crank G, which projects through the frame A. The end of the bail G may be squared for securing the lever J, or the lever J may be secured thereto by other suitable means. The lever J is provided with a spring-pawl, which adapts it to engage with a segment-rack $j$, secured to the frame A.

The crank or bail H is provided with an arm K, which is connected with the lever J by a link $k$.

The bails or cranks G and H support the plow-beam E. When the plow is out of the ground, it can be lowered by simply releasing the spring-pawl of the lever J, which will allow the bails or cranks G and H to turn downwardly and the plow to run into the ground. When the plow has run into the ground the proper depth, it can be set at that depth by means of the spring-pawl on the lever J engaging with the rack-segment $j$. The two bails G and H hold the plow in the position in which it is placed, so that the plow will not of itself run into or out of the ground. The front end of the beam is held rigidly in the proper position by the bail H, so that the plow will always have the proper pitch and the proper suction. Heretofore the plow in wheeled plows has been swung on a single bail or crank, leaving the plow to swing freely and requiring that the hitch at the clevis be exactly right to give the best results. By the use of two bails G and H the plow is at all times held rigidly in proper position. The two cranks G and H are swung upwardly or downwardly together by means of the lever J, link $k$, and crank K. This causes the plow to be raised squarely and easily.

What I claim as new, and desire to secure by Letters Patent, is—

1. The combination, with the plow-frame A and three carrying-wheels therefor, of a beam E, a bail G, attached to the rear of the beam E, and a bail H, attached to the forward portion of the beam, said bails being pivotally supported upon the plow-frame A, a link k, and the lifting-lever J, substantially as and for the purpose specified.

2. The combination, with a plow-frame A and three carrying-wheels therefor, of a plow-beam E, bails G and H, attached to said beam E a short distance apart and pivotally supported in said frame A, link k, lever J, segment-rack j, and a spring-pawl on said lever, whereby the plow may be locked in any desired position, substantially as specified.

GILPIN MOORE.

Witnesses:
CHARLES O. NASON,
J. T. FRANCIS.